United States Patent

[11] 3,577,696

[72] Inventors Herbert G. Bock
Farmington;
Walter J. Szerejko, Newington, Conn.
[21] Appl. No. 856,226
[22] Filed Apr. 29, 1969
Division of Ser. No. 758,904,
Sept. 10, 1968
[45] Patented May 4, 1971
[73] Assignee Chandler Evans Inc.
West Hartford, Conn.

[54] METHOD OF FILLING A PRESSURE VESSEL ASSEMBLY
3 Claims, 3 Drawing Figs.
[52] U.S. Cl. ........................................................ 53/7, 53/86, 53/97
[51] Int. Cl. ........................................................ B65b 31/02
[50] Field of Search ........................................... 53/7, 12, 82, 83, 86, 97, 99, 101, 100, 102, 109

[56] References Cited
UNITED STATES PATENTS

| | | | |
|---|---|---|---|
| 1,790,787 | 2/1931 | Badger ........................... | 53/83 |
| 2,202,569 | 5/1940 | Armstrong .................... | 53/101X |
| 2,435,747 | 2/1948 | Larson .......................... | 53/86X |
| 2,481,042 | 9/1949 | Tomasek et al ............... | 53/83X |

*Primary Examiner*—Travis S. McGehee
*Attorney*—Radford W. Luther

ABSTRACT: A metal high-pressure gas storage vessel has a threaded neck adapted to engage a threaded cap such that both cap and neck sealingly bear against an interposed seal element. The seal and cap are loosely assembled with the empty bottle and placed in a fluidtight filling fixture whereupon highly pressurized gas is introduced to the fixture, causing the bottle to fill by leakage between the loosely engaged threads. Then the cap is tightened and the fixture is vented prior to removal of the filled bottle. To lock the cap against rotation, the cap is locally upset into grooves in the neck after the acceptability of the charge has been verified.

PATENTED MAY 4 1971

INVENTORS
HERBERT G. BOCK
WALTER J. SZEREJKO

BY Radford W Luther
ATTORNEY

METHOD OF FILLING A PRESSURE VESSEL ASSEMBLY

This is a division of application Ser. No. 758,904, filed Sept. 10, 1968.

BACKGROUND OF THE INVENTION

Missile flight control systems having aerodynamic fins positioned by cold gas powered actuators generally include a pressure vessel to supply pressurized gas. Conservation of vehicle weight to increase payload capacity makes high-pressure helium an attractive gas source for actuator power. An efficient and reliable sealing technique is necessary to insure that adequate pressure will be retained in the vessel after storage of long duration under adverse environmental conditions. Reliability can be enhanced by utilizing a vessel having a single unvalved opening therein. Optimum sealing can be obtained using a threaded cap configuration to which a specific optimum torque is applied. The optimum torque requirement of the threaded cap configuration would be compromised if traditionally accepted threaded vessel closure means are used which require that the vessel and closure occupy one of a number of discrete angular positions with respect to each other to permit an alignment of means intended to interlock said vessel and closure against inadvertent rotation. Storage duration and conditions prohibit the use of threaded joint sealants which may be subject to degradation or the use of check valves subject to open under vibration or shock loads. Furthermore, the use of a thread sealant would interfere with the pressure-vessel-filling process.

SUMMARY

Reliable sealing of high-pressure helium requires a better technique than the conventional check valve type of fill valve used on most small pressure vessels. The efficient sealing of high-pressure gaseous containers to prevent leakage is directly affected by the degree of uniform pressure that can be exerted on the sealing member. One of the most efficient high-pressure sealing methods involves deforming a soft metal strip between two hard metal surfaces. The uniformity with which the load is distributed over the entire area of the soft metal strip to be deformed directly affects the efficient sealing of this particular type of sealing device.

The present invention provides a method of filling a vessel having a threaded closure through loosely engaged threads and of permanently fastening one of the hard sealing elements to the other once the appropriate uniformly distributed load has been applied to the deformable sealing element. The permanent fastening means comprises an annular projection extending from the open end of the internally threaded hardened element such that this annular projection or ring circumscribes the externally threaded hardened element. This annulus or ring so encompasses the externally threaded hardened element that once the desired torque has been applied to the internally threaded element to permit the uniformly distributed load to be applied to the soft deformable element, two localized areas of the annular projection or ring can be upset or deformed into two longitudinal grooves or slots cut into the periphery of the externally threaded hardened element. This localized upsetting action permanently fastens the two threadable engaged hardened elements to each other.

Some of the objects of this invention are:
to provide a method for filling a pressure vessel having an externally threaded cap;
to provide a method for filling a pressure vessel to an extremely high pressure; and
to provide a method for filling a pressure vessel having an externally threaded cap and ascertaining that the vessel has been filled to the proper pressure.

Further objects will be apparent to those versed in the art after examination of the specification and drawings.

DESCRIPTION OF THE PREFERRED EMBODIMENT

Figure 1:
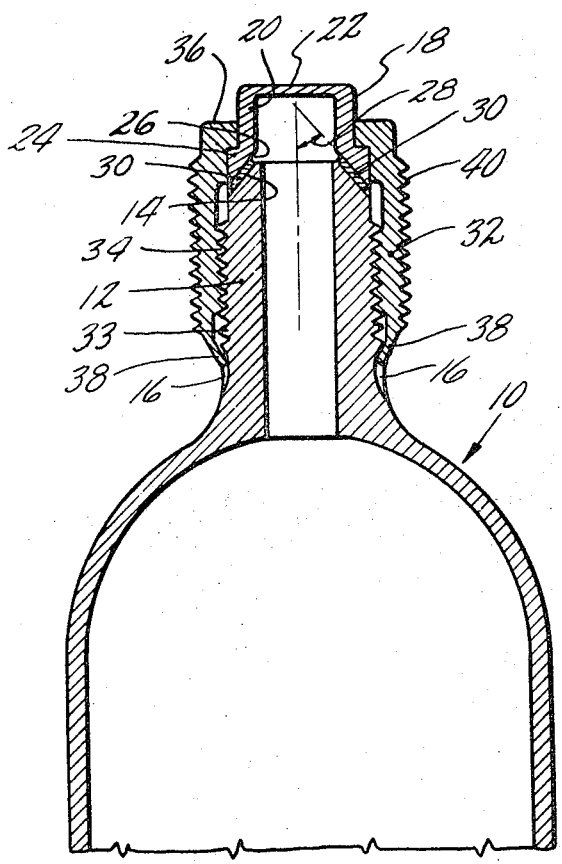
FIG. 1 is a partial side elevation view of an assembled pressure vessel and cap.

Referring to FIG. 1, a pressure vessel 10 has an externally threaded hollow neck section 12 with a first annular beveled sealing surface 14 and at least one longitudinal local recess 16 disposed on the periphery of said neck section 12. A diaphragm, shown generally at 18, has a cylindrical body 20 with one closed end 22 and an open end having an outwardly projecting terminal flange 24 thereon, said flange 24 defining a second annular beveled sealing surface 26 having a bevel angle 28, surface 26 being substantially the mate to sealing surface 14. The bevel angle 28 of surfaces 14 and 26 is preferably 37° with respect to the vessel longitudinal axis. A metal-to-metal seal is preferred to form a reliable seal under adverse environmentally storage conditions of high stress, humidity, temperature, fungus, dirt, shock and vibration. If a large hardness differential exists between surfaces 26 and 14, an interposed sealing element 30 is not required. However, in the preferred embodiment, where surfaces 26 and 14 are of similarly hard steel, a frustroconical sealing element 30, preferably of tin plated copper which will readily flow under high pressure to fill any minor imperfections in sealing surfaces 26 and 14, is inserted between said sealing surfaces. A diaphragm retaining sleeve, shown generally at 32, has internal threads 34 which engage external threads 33 on neck section 12. Inwardly projecting flange 36 integral with sleeve 32 urges diaphragm terminal flange 24 towards neck section 12 as the engagement between sleeve 32 and neck 12 is increased, thus loading surfaces 14 and 26 against each other or against sealing element 30 if an interposed sealing element is utilized. A slight clearance provided between flange 36 of sleeve 32 and cylindrical body 20 causes sealing surfaces 14 and 26 to mate properly despite minor misalignment of the sealing surfaces with the respective threaded members. Sleeve 32 and diaphragm 18 form a cap somewhat analogous to a conventional threaded bottle cap. Once the desired axial sealing force has been attained as indicated by measurement of torque required to advance the engagement of sleeve 32, an annular lip 38 integral with sleeve 32 is inelastically deformed into recess 16 to fix the relative positions of said vessel 10, diaphragm 18, and sleeve 32 so as to preserve and maintain the integrity of the seal.

Figure 3:
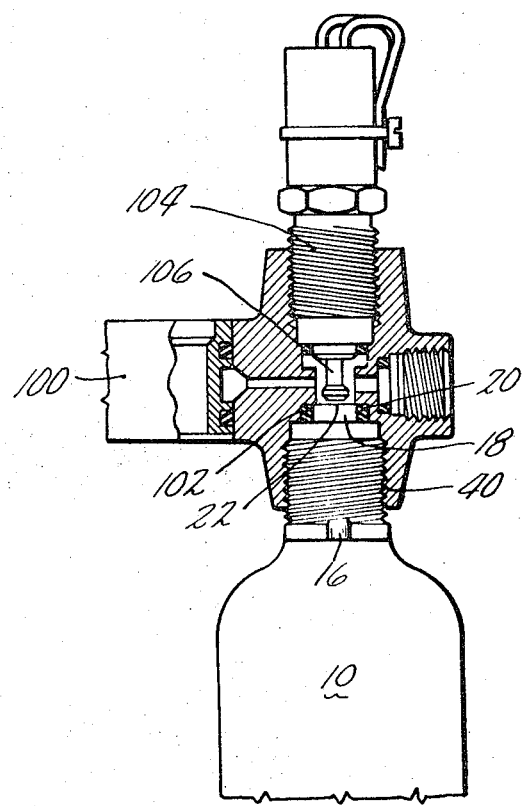
FIG. 3 is a side elevation view of a preferred capped pressure vessel filled by a method according to the instant invention threadably engaged with a fluid distribution system.
Figure 2:
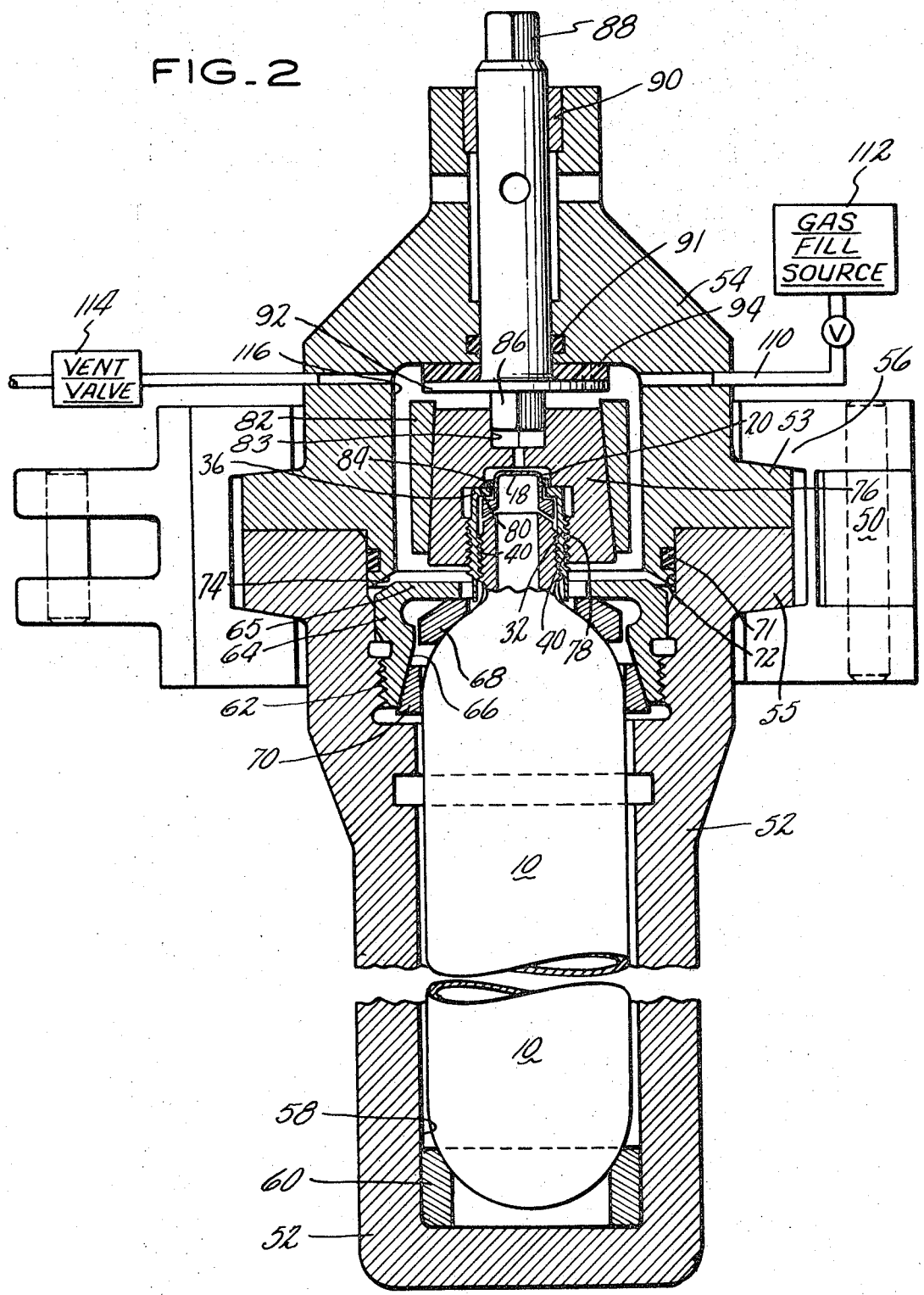
FIG. 2 is a side elevation view of a pressure-vessel-filling apparatus adapted to perform a method according to the instant invention.

Sleeve 32 has external threads 40 thereon which as shown in detail in FIGS. 2 and 3 are useful both for filling the vessel and for achieving sealed installation of the vessel in a pressure distribution system having therein ram means to puncture closed end 22 of diaphragm 18. A portion of the cylindrical body 20 of diaphragm 18 is elongated and carefully finished to sealingly mate with an O-ring seal 102 housed in said pressure distribution system shown in FIG. 3.

Referring to FIG. 2, a fill fixture, shown generally at 50, comprises a flanged base 52 and a flanged cover 54 held together by a hinged split ring 56 adapted to be closed by a handle (not shown) having a camming action whereby a large lever ratio is applied to axially urge together flanges 55 and 53 of base 52 and cover 54 respectively. Bore 58 in base 52 is adapted to receive vessel 10 loosely therein, support being given to said vessel by a contoured support sleeve 60 positioned in the base of bore 58 such that the end of vessel 10 will not bottom in bore 58. A larger threaded bore 62 in base 52 is adapted to threadably receive a cylindrical loading collar 64 having an inwardly extending flange 65 and conically tapered interior surface 66. Flange 65 bears against a contoured thrust ring 68 which loads vessel 10 against support sleeve 60 and tapered centering ring 70 through conical surface 66. Loading collar 64 is torqued to a value in excess of the torque to be applied later to the vessel cap so that when the latter torque is applied the vessel will not turn within the fixture. A smooth bore 72, still larger than threaded bore 62 is adapted to sealingly receive an O-ring seal 71 positioned in cylindrical extension member 74 integrally connected to cover 54. It is to be noted that before cover 54 is secured in place, a split nut structure 76 having internal threads 78 is affixed to vessel sleeve 32 such that threads 78 engage external threads 40 on sleeve 32 and such that an internal shoulder 80 on nut 76 bears against flange 36 on sleeve 32. A tapered ring 82 is driven onto split nut 76 with care being taken not to disturb a spring clip 84 placed on the elongated body 20 of diaphragm 18 to grasp said diaphragm and bear against flange 36 of sleeve 32. Clip 84 prevents pressure in the fill fixture from forcing diaphragm 18 into fluidtight engagement with sealing element 30 (shown in FIG. 1) while the cap is slightly backed off to permit gas to enter vessel 10. Nut 76 has therein a rectangular slot 83 adapted to receive driver bit 86 integral with shaft 88 mounted for rotation in bushing 90 in cover 54 and sealingly engaged by O-ring seal 91 in said cover. Shaft 88 has a flange 92 thereon and a low-friction thrust washer 94 is interposed between said flange and said cover to minimize the torsional friction component caused by the gas force tending to blow shaft 88 out of the cover.

With cover 54 sealingly engaging and locked to base 52, gas is supplied for a few seconds to bore 116 via passageway 110 and gas fill source 112 while a fixture vent valve 114, well known in the art, is held open to purge the fixture of air. When the purging operation is complete, the vent valve 114 is shut and the fixture brought to a pressure somewhat below the desired charge pressure whereupon the temperature within the fixture is recorded and the fixture is pressure filled to the final fill based upon a pressure calculated on the basis of the pressure desired when the fixture has cooled to room temperature. The final charging flow is permitted to fill the fixture and torque is applied to shaft 88 to rotate split nut 76 thereby causing sleeve 32 to rotate therewith and, as shown in FIG. 1, drive diaphragm 18 against sealing element 30 and neck 12 until the desired torque has been provided for optimum sealing. Thereafter the fixture is vented and the cover removed. Tapered ring 82 is removed and the split nut 76 taken off. Loading collar 64 is unthreaded from base 52, items 68 and 70 are removed, and the vessel is removed and weighed carefully to ascertain that the weight increase from a previously recorded empty weight indicates the desired weight of gas. A mass spectrometer is utilized to ensure that the leakage rate is consonant with the specified storage duration; if the leakage rate is satisfactory, lip 38 is crimped into recess 16 to lock the cap in place, as shown in FIG. 1.

Referring to FIG. 3, vessel 10 by means of external threads 40 threadably engages a distribution manifold 100 with O-ring seal 102 engaging elongated body 20 on diaphragm 18. When an electrical command signal is delivered to an explosively actuated cutter valve 104, a ram 106 therein punctures end 22 of diaphragm 18 permitting vessel 10 to supply pressurized gas to passageways within manifold 100 leading to various fin-actuating mechanisms.

By way of illustration, a pressure vessel construction is shown that limits leakage such that an initial nominal charge of 10 cubic inches of Grade A helium at 6,800 p.s.i. will be at no less than 6,680 p.s.i. after a 5-year storage period. The material used for sleeve 32, diaphragm 18 and neck section 12, shown in FIG. 1, is AMS 6370 having a nominal C-scale Rockwell hardness of 29. The mated frustroconical sealing area between surfaces 14 and 26, shown in FIG. 1, has an approximate I.D. of 0.297 inch, an O.D. of 0.435 inch, and a bevel angle of 37° with respect to the vessel longitudinal axis. The thread engagement between sleeve 32 and the neck section 12 is 0.562–18 UNF–2A and 2B modified by tip relief to insure a clearance through which vessel filling can take place prior to sealing the vessel. The torque applied to sleeve 32 to insure an optimum seal under these conditions (using a copper sealing element 30 with 0.0003 -inch tin plate per MIL–T–1 0727) is nominally 315 inch-pounds. The deformable annular lip 38 has a radial thickness of approximately 0.020 inch and two longitudinal diametrically opposed grooves 16 are approximately 0.100 inch wide and 0.030 inch deep. Approximately 10 grams of helium are added and leakage must not exceed $9.2 \times 10^6$ atms. c.c./sec. as determined by mass spectrometer analysis.

It will be apparent to those skilled in the art that various changes and modifications may be made in the disclosed method; accordingly, it will be understood that the description and drawings have been set out to illustrate rather than limit the inventive concept.

We claim:

1. A method of filling a pressure vessel having a neck portion with a cap covering the neck, the cap including a diaphragm and an externally and internally threaded sleeve to retain the diaphragm, the method comprising the sequential steps of:

securing a structure into threaded engagement with the exterior of the sleeve while maintaining a flow path between the diaphragm and neck portion;

enveloping the vessel in an enclosure;

locking the enclosure to form a fluidtight enclosure;

filling the vessel with a fluid to a predetermined high pressure;

rotating the structure to tighten the cap and thereby close the flow path;

venting the enclosure;

unlocking the enclosure; and removing the structure from the sleeve.

2. The method as defined in claim 1 further comprising:

weighing the vessel after removing the structure to ascertain the weight increase from a previously recorded empty weight.

3. The method as defined in claim 2 further comprising:

crimping the sleeve to lock the cap after weighing the vessel.